United States Patent
Suzuki et al.

(10) Patent No.: US 7,925,633 B2
(45) Date of Patent: Apr. 12, 2011

(54) DISASTER RECOVERY SYSTEM SUITABLE FOR DATABASE SYSTEM

(75) Inventors: Yoshio Suzuki, Kokubunji (JP); Nobuo Kawamura, Atsugi (JP); Kota Yamaguchi, Yamato (JP); Shinji Fujiwara, Sagamihara (JP); Satoru Watanabe, Kokubunji (JP); Masaru Kitsuregawa, Tokyo (JP)

(73) Assignee: Hitachi, Ltd., Tokyo (JP)

( * ) Notice: Subject to any disclaimer, the term of this patent is extended or adjusted under 35 U.S.C. 154(b) by 664 days.

(21) Appl. No.: 10/989,398

(22) Filed: Nov. 17, 2004

(65) Prior Publication Data

US 2005/0283504 A1 Dec. 22, 2005

(30) Foreign Application Priority Data

Jun. 17, 2004 (JP) ................................. 2004-179433

(51) Int. Cl.
  *G06F 7/00* (2006.01)
(52) U.S. Cl. ...................................................... 707/674
(58) Field of Classification Search .................. 707/204, 707/674
  See application file for complete search history.

(56) References Cited

U.S. PATENT DOCUMENTS

| 5,640,561 | A | 6/1997 | Satoh et al. | |
| 6,226,651 | B1 * | 5/2001 | Masuda et al. | ................ 707/202 |
| 2001/0344141 | | 10/2001 | Suto | |

FOREIGN PATENT DOCUMENTS

| JP | 09-062555 | 3/1997 |
| JP | 2001-344141 | 12/2001 |

OTHER PUBLICATIONS

Oracle Technology Network, "*Oracle Database 10g Oracle Data Guard*," Web:http://otn.oracle.com/deploy/availability/htdocs/DataGuardOverview.html; Apr. 6, 2004, pp. 1-7.

* cited by examiner

*Primary Examiner* — Etienne P LeRoux
*Assistant Examiner* — Ajith Jacob
(74) *Attorney, Agent, or Firm* — Antonelli, Terry, Stout & Kraus, LLP

(57) ABSTRACT

To reduce operational and management costs during normal operations while recovering a database without loss and maintaining on-line performance on a site. A first system includes a primary storage system (103) that stores a DB (107) and a main computer (100) that executes a primary DBMS (101), which provides a DB. A second system includes a secondary (113) that receives from the primary storage system (103) a copy of a log, which shows update differences of the DB (107), and stores a secondary DBMS (117), and a subset (500) that recovers the secondary DB (117) according to the log that is copied from the primary storage system (103). When a failure occurs in the first system, the first system is switched to the second system. A second computer (110) that executes a second DBMS (111) is added to the second system, and the secondary DB (117) that is recovered or is being recovered in the subset (500) is taken over to the second computer (110).

16 Claims, 16 Drawing Sheets

DISASTER RECOVERY SYSTEM SUITABLE FOR DATABASE SYSTEM

CLAIM OF PRIORITY

The present application claims priority from Japanese application P2004-179433 filed on Jun. 17, 2004, the content of which is hereby incorporated by reference into this application.

CROSS-REFERENCE TO RELATED APPLICIONS

This application is related to following co-pending applications:
U.S. application Ser. No. 10/849,006, filed May 20, 2004,
U.S. application Ser. No. 10/930,832, filed Sep. 1, 2004,
U.S. application Ser. No. 10/184,246, filed Jun. 26, 2002,
U.S. application Ser. No. 10/819,191, filed Apr. 7, 2004,
U.S. application Ser. No. 10/910,580, filed Aug. 4, 2004.

BACKGROUND

This invention relates to an improvement of a disaster recovery system, and more particularly to a disaster recovery system suitably applicable for a database.

In recent years, information technology (IT) systems are so indispensable for business that continuing business despite failures or disasters becomes more and more important. The opportunity loss accompanied by stopping IT systems will be so huge that it is said to be, for example, millions of dollars in the financial sectors or major enterprises. Against such a background, attentions have been focused on a disaster recovery (hereinafter called "DR") technology, which provides two (primary/secondary) sites to back up business data into the secondary site in normal times, and to continue the business on the secondary site in the event of a disaster.

It is the most important requirement that a database (hereinafter called "DB") is recovered without any loss even in the event of a disaster in DR because data of enterprises are usually stored in such a DB. Because backups are executed continuously in normal times, it is also required that the influences on on-line business in the primary site should be minimized. Further, in recent years, preparing for a wide area disaster such as an earthquake, that is, a DR system locating a secondary site at a remote area hundreds to thousands of kilometers away is demanded.

In the DR system, in the event of a disaster, the DB is recovered in the secondary site, and the business is resumed by a database management system (DBMS) in the secondary site. A conventional method of updating a DB of a DBMS and recovering a DB in the event of a failure or a disaster is described.

First, the method of updating a DB in normal operations is described. The DBMS manages logs which record differences of data in addition to a DB wherein data is stored. When a data change is instructed to the DBMS, the differences created by the change are recorded on a log file wherein the log is recorded on the storage system. However, such a change is outputted to a storage system at certain times without being reflected on the DB soon, for improving performance. About the certain times, the process called a checkpoint (hereinafter called "CP") is well known. The CP is generally issued taking the opportunity where a predetermined period of time has passed, or, a predetermined number of transactions are conducted. Here, the logs representing updated differences have serial numbers (log sequence numbers or LSN), because the logs are added each time an update is executed. At the time of CP, CP information including CP acquired time or the LSN of the log in order to indicate up to which log is applied to the DB, is recorded. A header of a log file or an exclusive file is considered as the destination wherein CP is saved. The following describes a case where an exclusive file is used.

A DB recovery process in the event of a failure is executed with the CP as a starting point. The procedure is described with reference to FIG. 16. First, CP information is read in a step 201, and then a log reading position is decided in a step 202. In other words, reading may be started from the log after the LSN which is recorded in the CP information (ensuring that the log has been reflected to the DB at the time of CP). Next, in a step 203, log files are read to the end and the logs are applied to the DB in a sequence of reading. The log is recorded with an image after the update is applied and a destination where the update is applied (in some cases, operations are recorded instead of images). Applying the image to the corresponding destination allows reproducing the added updates. Such a log application process is called a redo process or a roll forward process.

Here, redo processes are executed while managing the commitment of transactions (hereinafter called "Tr"), that is, the transaction is committed or uncommitted are managed. Tr management can be executed, for example, by using the management table illustrated in FIG. 17. For example, a transaction table 300 may have items including a transaction identification (Tr-id) 301 which is uniquely assigned to each Tr, and an LSN 302 of the starting log of the Tr. When a starting log that belongs to a new Tr is read, its Tr-id and LSN are registered in the transaction management table. Otherwise, as shown in a transaction management table 310 in FIG. 7, the chain of information 313 (an LSN 320, a log type 321, a usage resource 323) of the log which forms the Tr, for each Tr (a Tr-id 311) may be managed. When the Tr is committed, the corresponding Tr is deleted from the table. Through this operation, when all logs are applied, the list of uncommitted Tr is obtained.

When logs are all read and there is no unapplied log, uncommitted transactions are deleted by using this Tr management table, that is, reading back the logs of relating Tr and canceling the transactions. This canceling process is called as an undo process or a rollback process. When the undo process is completed, the DB has consistency where only the updates included in committed Tr are reflected, and it is allowed to resume the business to add new updates.

It is possible, by resuming the business in parallel with the undo process, to reduce the time to restart. In other words, at the time the redo process is completed, a resource, which is used for an uncommitted Tr, is deduced, and the resource is locked while resuming the business.

In recent years, storage systems become more and more sophisticated, and storage systems including a remote copy function allowing transmission between the sites without a server have been developed. A DR system adopting this remote copy function is shown in FIG. 15. A primary site 1 and a secondary site 9 have, respectively, a primary server 100 and a secondary server 110, and a primary storage system 103 and a secondary storage system 113. The servers and storage systems are respectively connected via a server-to-server network 150 and a storage-to-storage network 120. Further, a primary DBMS 101 and a secondary DBMS 111 are installed in the primary server 100 and the secondary server 110, respectively.

In normal operations, business is conducted in the primary DBMS 101 of the primary site (hereinafter called "primary DBMS"). The storage systems 103 and 113 include a primary DB 107 and a secondary DB 117, and the volumes which store a primary log 106 and a secondary log 116, respectively. The primary log 106 and the primary DB 107 are respectively copied to the secondary log 116 and the secondary DB 117 by a remote copy 140.

In this structure, the secondary server 110 is unnecessary in normal operations because backups in normal operations are feasible only with a storage system. Only when business is conducted at the secondary site 9 because of a disaster and the like, the secondary server 110 is necessary. In that case, the process starts the DBMS 111 on the secondary site 9, executes the recovery process (redo/undo) as described in FIG. 16, and resumes receiving business. For copying method of the logs 106, 116, and the DBs 107, 117, the method of transmitting both the logs and the DBs by synchronous remote copy is well known. In the synchronous copy, writing to the primary site 1 is not completed until copying to the secondary site 9 is completed. Therefore, it is ensured that the update in the primary site 1 has been transmitted to the secondary site 9, and it is possible to recover the DB without any loss even in the event of a disaster. However, there is a problem in that the on-line performance in the primary site 1 is degraded due to delays added each time the writing is executed when the secondary site is located hundreds of kilometers away from the primary site in order to prepare for a wide area disaster.

In view of the above, there is a known method in which a log including differences to update is transmitted synchronously and a database, which is recoverable from the log, need not be transmitted in order to realize recovering without loss and sustain the on-line performance simultaneously. In other words, a method of recovering a DB in a secondary site is realized by redoing a log that is copied from a primary site is known (for example, U.S. Pat. No. 5,640,561).

Likewise, a method in which log transfer function is incorporated to a DBMS is also well known ("Oracle Data Guard", "Overview of Oracle Data Guard Functional Components", [online], "Searched Apr. 27 2004", <http://otn.oracle.com/deploy/availability/htdocs/DataGuardOverview.html>).

The system construction is described referring to FIG. 18. It is the same that a primary/a secondary site comprises, respectively, a server 100/110 and a storage system 103/113, and a DBMS 101/110 is installed in the corresponding server 100/110. However, it is unnecessary for the storage system 103/113 to have a remote copy function, the connection between the sites is connected only via a network 110. Copying a log 106 is executed by the DBMS 101/111, that is, the primary DBMS 101, simultaneously, writes in the primary storage system 103 and forwards the log to the secondary DBMS 111. The secondary DBMS 111 simultaneously writes the received log to the secondary storage system 113 and updates the DB by applying the read log to the DB 117.

SUMMARY

However, in the conventional example descried above referring to FIG. 18 ("Oracle Data Guard", "Overview of Oracle Data Guard Functional Components", [online], "Searched Apr. 27, 2004", <http://otn.oracle.com/deploy/availability/htdocs/DataGuardOverview.html>), the DBMS must be operated in the normal time and there is a problem in that the business handling is subjected to pressure due to the transmitting load because transmitting is executed between the servers. Further, a computer equivalent to the primary site must be operated in the secondary site in order to continue the business in the event of a disaster. However, the actual possibility of the occurrence of a wide area disaster is only several percents of the whole stopping reason. Therefore, there is a problem in that operating the secondary server even in the normal operations increases the operating and construction cost.

In consideration of the above problems, this invention aims to reduce the operation management cost in the normal operations while recovering a DB without loss and maintaining on-line performance.

According to this invention, a first system includes a first storage system that stores a first database and a first computer that executes a first DBMS, which provides a first database. This invention also includes a second system that has a second storage system, which receives a copy of information related to the first database (for example, a log indicating updated differences) from the first storage system and stores a second database, and a database recovery module that recovers the second database, according to the information copied from the first storage system. If a failure occurs in the first system, the first system is switched to the second system, a second computer in which a second DBMS executes is added to the second system, and the second database that is recovered or being recovered by the database recovery module is taken over to the second computer (the second DBMS).

Therefore, this invention recovers a database without loss by recovering a second database (for example, a log applying) according to information related to a first database. A first system and a second system only copy between storage systems, so that on-line performance in a first system (site) is ensured. During normal operations, only a database recovery module may be executed, and a second computer that executes a second DBMS is not necessary, so that operational and management costs are reduced. In the event of failure, a second DBMS executes by adding a second computer to a second system, and a second database is taken over from a database recovery module, so that a second database service can start.

DETAILED DESCRIPTION OF THE PREFERRED EMBODIMENTS

Hereinafter, a first embodiment of this invention will be explained referring to the accompanying drawings as follows.

Figure 1:
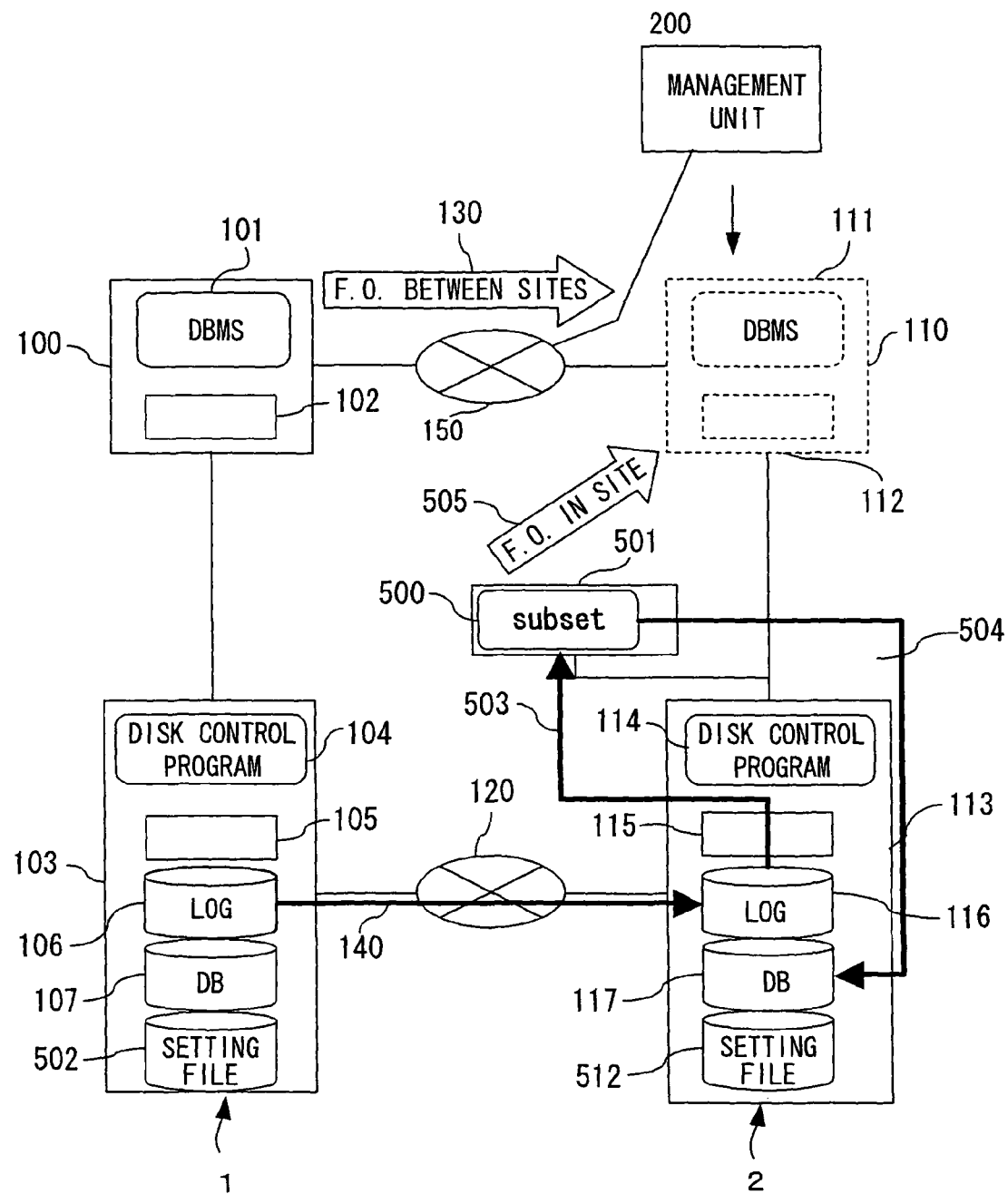
FIG. 1 shows a first embodiment of this invention and a system block diagram providing a disaster recovery at two sites.

FIG. 1 is a figure of typical system used in this invention, and shows an example to execute a disaster recovery between two sites.

FIG. 1 shows an example that a subset 500 of a database management system (DBMS) function which is off-loaded (divided) from a secondary DBMS in a secondary site 2 operates in an exclusive unit (an intermediate unit) 501 located between a secondary server 110 and a secondary storage system 113.

A primary site 1 includes a primary server 100 and a primary storage system 103. The primary server 100 is installed with a primary DBMS 101 that receives business. The primary DBMS 101 manages a DB (database) 107 by using a DB buffer 102 on a memory of the primary server 100 and the primary storage system 103. The DB 107 is located onto the storage 103, but updates are executed on the DB buffer 102 in the normal operations because accessing the primary storage system 103 for each update occurs degrades the performance. At the predetermined timing such as when a buffer 102 overflows, updates are reflected to the storage system 113.

The primary storage system 103 includes a cache 105, a disk control program 104, a control unit, and a plurality of volumes. Each volume has the DB 107 that stores a data body, a log 106 that stores update differences to the data (DB 107), and a setting file 502 that stores a checkpoint (CP) information file and the like. A CP is the same as the conventional example as described above.

The disk control program 104 controls a remote copy between the primary storage system 103 in the primary site 1 and the secondary storage system 113 in the secondary site 2 via an inter-storage network 120. Only the log 106 is forwarded using a synchronous or asynchronous remote copy.

The secondary site 2 has: the exclusive unit 501 including the subset 500, which is composed of functions of a part of the secondary server 110, the secondary storage system 113, and a secondary DMBS 111 (for example, a log applying function); the secondary server 110 operating only when a fail-over occurs; and the secondary DBMS 111 operating in the secondary server 110. The servers 110 and 111 in the primary site 1 and the secondary site 2, respectively, are connected via a network 150 between the servers. This network 150 is also connected to a management unit 200 that detects failures in the primary site 1.

The management unit 200 is composed of a computer, such as a server wherein a monitoring program and the like are executed. The management unit 200 detects failures of the primary site 1 by heart beats from the primary server 100 or such as failure information of the primary storage system 103.

If any failure is detected, the management unit 200 instructs a fail-over to the subset 500 or the secondary server 110 in the secondary site 2.

The exclusive unit 501 may be any computer provided with the processing performance to execute the subset 500, and is not required to have the processing performance to execute the DBMS 111.

The secondary server 110 is not required to operate as the secondary site 2 in the normal operations, and simply operates as the secondary site 2 at the starting point of the fail-over process to start the DBMS 111.

The secondary storage system 113 has a remote copy function. In the secondary storage system 113, the log 116, the DB 117, and the setting file 512 including the CP information file, are respectively located in the separated volumes. Among them, only the log 116 is forwarded from the primary storage 103 to the secondary storage system 113 by the remote copy function. As described above, the remote copy may be executed synchronously or asynchronously. In the synchronous remote copy, writing to the primary storage system 103 is not completed until copying to the secondary storage system 113 is completed. Therefore, it is ensured to copy data without any loss even in the event of a disaster or failure. However, there are considerable influences on the business conducted in the primary DBMS 101 due to the line delays added each time the writing is executed. On the other hand, when asynchronous copy is used, writing to the primary storage system 103 is thought to be completed before the forwarding writing to the secondary storage system 113 is executed and the processing continues. Accordingly, the influence on the primary DBMS 101 is minimized. However, if a disaster occurs before the completion of the writing to the secondary storage system 113, some losses are caused.

The primary DB 107 and the secondary DB 117 and the setting files 502/512 including respectively the primary/the secondary CP information are synchronized only when a disaster recovery (hereinafter, called "DR") system starts. The first synchronization may use a remote copy, a forward function if the primary DMBS 101 and the secondary DMBS 111 have the function, and a copy program such as ftp software. Consistency must be kept between the primary DB 107 and the secondary DB 117, and between the setting files 502 and 512, including respectively the primary/secondary CP information. In the primary/secondary setting files 502 and 512, a serial number of the log (log sequence number or LSN) is recorded, and this LSN should be reflected in the DBs 107/117 at least.

After the starting point of recovery, the secondary DB 117 will be recovered by applying a log not by a remote copy. The log application is executed by the exclusive unit 501, which is located between the secondary storage system 113 and the secondary server 110.

In the exclusive unit 501, a log recovery function, one of the functions of the secondary DBMS 111, is off-loaded as the subset 500. The exclusive unit 501 can be realized with a low-performance, low-price computer because the exclusive unit 501 is only required to execute applying logs. Therefore, the DR system can be built at low cost because the secondary server 110 does not need to be established, so only the exclusive unit 501 is necessary in the normal operations.

Besides, cost reduction in the phase of operating and management is possible because the subset 500 has limited functions, so complicated management is not necessary compared with the DMBS 111 including full functions.

Furthermore, the exclusive unit 501 exists only in the secondary site 2 in FIG. 1 described above. The exclusive unit 501 can also be located in the primary site 1. For example, switching system process may be executed not only in the event of a disaster, but also according to an organized plan. In that case, the rolls of the primary site 1 and the secondary site 2 are replaced while doing business in the secondary site 1 and executing recovery processes in the primary site 2. In that case, it is necessary to replace the copy source by the copy destination of the remote copy of the logs 106 and 107 and recover the DB 107 at the exclusive unit 501 in the primary site.

In the embodiment described above, the subset 500 may be the secondary DBMS 111 itself, when processing performance of the exclusive unit 501 is high enough.

<Switching from the Subset to the Secondary Server—1>

There are two procedures for switching in a secondary site 2: taking over to an upper-level server (a secondary server 110) while a recovery at a subset 500 (fail-over in the site), and taking over to an upper-level server after an entire recovery at the subset 500 is completed.

First, the procedure for taking over to an upper-level server while the recovery at the subset is described.

In the process, an upper-level server (the secondary server 110) that has been taken over the process from the subset 500 continues a recovery process. Business will be resumed after all recovery process is completed.

Figure 2:
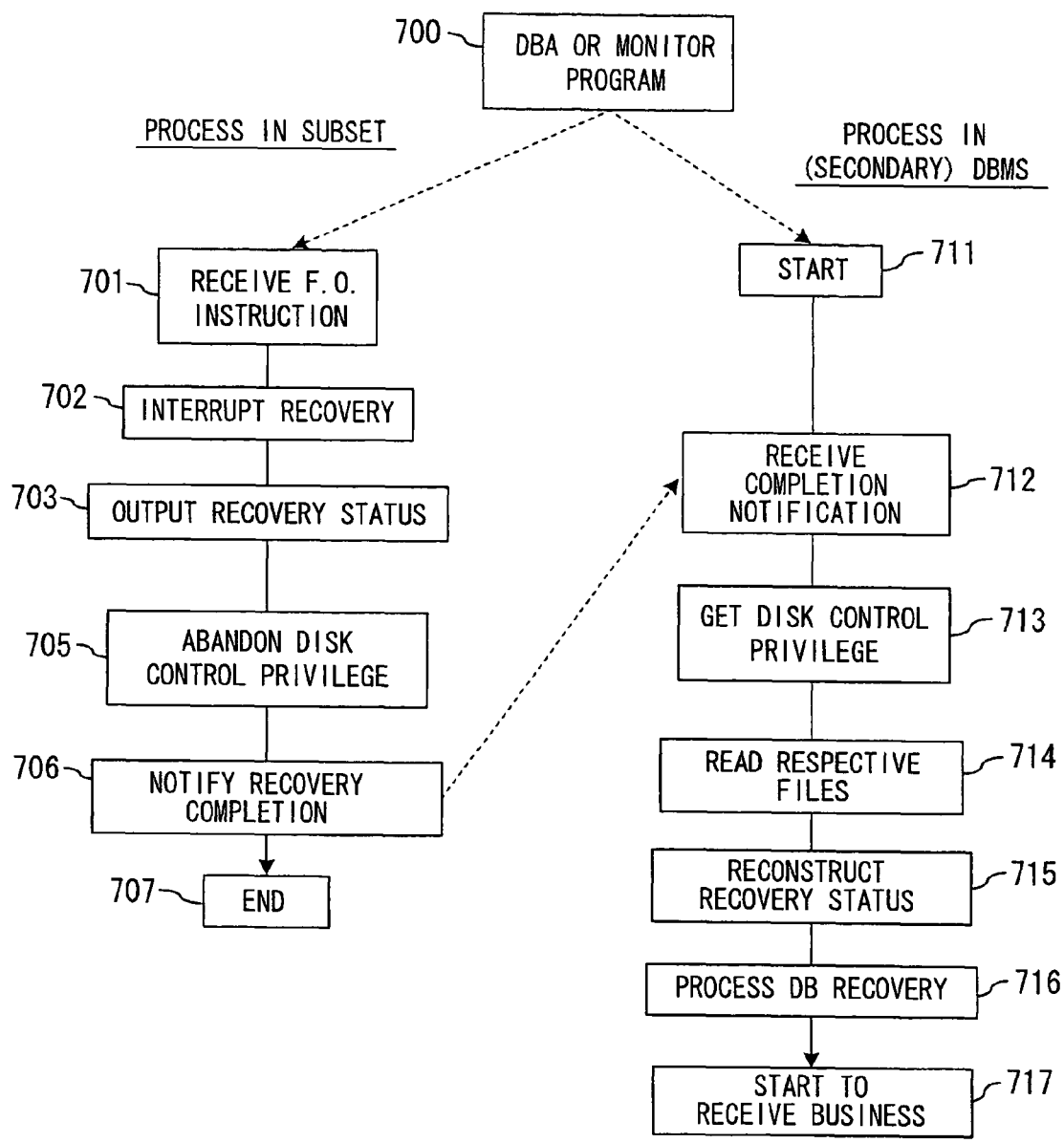
FIG. 2 is a flowchart for a process at a subset and a secondary DBMS at fail-over.

FIG. 2 shows a flowchart of the subset 500 and the upper-level server (the secondary server 110), and the procedure that immediately takes over to the secondary server during the recover of the subset.

The subset 500 usually executes applying logs as described above and it is possible that the subset 500 can receive F.O. (fail-over) instructs from the management unit 200 and the like, by interrupt or other means.

First, in a step 700, the subset 500 receives an F.O. instruction from a user (a DB administrator or a DB 101), monitoring software or the like.

After receiving the F.O. instruction, in a step 711, the secondary DBMS 111 starts if it is not started, and becomes stand-by before disk-access. The secondary DBMS 111 cannot be started when the F.O. is due to a disaster, but if the F.O. is due to a planned incident, the secondary DBMS can be started in advance.

On the other hand, in a step 702, the subset 500 stops applying logs when the F.O. instruction is received. Then, in a step 703, the execution conditions of the DB recovery process are outputted. The output may be performed to a file on the secondary storage system 113 or to a memory in the subset 500.

Next, in a step 705, the subset 500 discards a disk control privilege of the secondary storage system 113 that has been held by the subset 500, and in a step 706, notices a completion of the recovery processing at the subset 500 to the secondary server 110.

The notice can be sent directly to the secondary DBMS 111, or to a DB administrator (DBA) or the management unit 200. Besides, when recovery conditions of the DB (the secondary DB 117) in the step 703 are outputted to the memory in the subset 500, the DB recovery conditions may be transmitted at the same time when the memory completion is notified to the secondary DBMS 111.

The DB administrator (DBA) or the secondary DBMS 111 that receives the notice obtains the disk control privilege in a step 713, and then reads respective files in a step 714. The starting point of reading logs is determined by, for example, reading the setting file 512 including the CP information.

In a step 715, DB recovery conditions are reconstructed according to information obtained by reading files or communication between processes. Sequentially, in a step 716, the location to be resume recovery is specified according to the reconstructed recovery conditions to resume the DB recovery processes (log applications). After the log 116 is read and applied to the end, undo processes are executed on the uncommitted transaction (hereinafter called "Tr") to complete the DB recovery process. The undo process is executed similarly to the conventional example.

After the DB process completion, in a step 717, receiving business is resumed. Receiving business with some limitations can be conducted at the same time of resuming undo.

In this procedure, recovery time can be reduced because: the recovery processes after the stop instruction of the subset 500 can be executed in the upper-level server (the DBMS 111 in the secondary server 110); and business with some limitations can be conducted.

As described above, in the method of taking over to an upper-level server while the recovery is committed at the subset 500, the secondary DBMS 111 should take over the DB recovery conditions executed at the subset 500 to complete the DB recovery processes.

<Taking Over the DB Recovery>

Regarding to procedures for taking over DB recovery conditions between the subset 500 and the secondary server 110, the following are considered: taking over with files; and taking over with communication between processes. The procedure for taking over with files is described below. With regard to files, there are methods of using CP information file (the setting file 512) conventionally used in the DBMS and of defining new files.

Firstly, the procedure for taking over DB recovery conditions using a checkpoint (CP) information file is described. A usual CP information file is updated in the event that a predetermined time has passed or that a predetermined number of Tr has been processed. At this point, while data not yet reflected upon the DB 107 (on the storage system 103) on the DB buffer 102 is reflected upon the DB 107, an LSN indicating up to which part of the log 106 is reflected upon a DB 107 and time stamp information are recorded in the CP information file (the setting file 502). Through this CP process, the CP information file becomes consistent with the DB 107.

In this invention, in the secondary site 2, a CP is created pretentiously, independently of the CP issued in the primary site 1 to update a CP information file.

In other words, the subset 500 notifies DB recovery conditions to the secondary DBMS 111 using the CP information file including the pseudo-CP information generated independently of the primary site 1. The timing generating pseudo-CP is considered to be the timing when the DB administrator or the secondary DBMS 111 receives F.O. instructions or stop instructions. Otherwise, a pseudo-CP may be generated when a predetermined time has passed or a predetermined number of logs have been processed. Alternatively, if a CP generated in the primary site 1 is recorded on the log 116 as event information, a pseudo-CP may be generated when the event log is read in the subset 500.

As procedures for generating a pseudo-CP in the subset 500 in the secondary site 2, there are not considering Tr executing conditions and considering executing conditions.

<Generating Pseudo-Checkpoint—1>

First, a procedure for generating a pseudo-CP not considering Tr executing conditions and updating a CP information file is described.

If Tr executing conditions are not considered, an LSN of the log 116, last applied in the subset 500 or time stamp information may be written in a CP information file (step 1001 in FIG. 3) at the point when an F.O. instruction or a stop instruction is received, or a CP event log is read. At the startup of the secondary server 110, it is possible to know up to which point of the log 116 is applied to the DB 117 in the secondary site 2 by reading the file. Therefore, after the log 116 is read, DB recovery can be completed by applying logs that occur after the LSN and executing undo finally. However, when the procedure is used, resuming business with some limitations is impossible in the secondary DBMS 111.

The secondary DBMS 111 manages resource (resource that is used for a Tr is locked until the Tr is committed) during a recovery process. When resuming process in the secondary DBMS 111, this resource information cannot be taken over, so that complete resource information is not obtained at the end of redo. As a result, if a Tr, which is uncommitted during takeover, is still not committed at the subsequent redo by the secondary DBMS 111, the resource that should be locked by the Tr cannot be reproduced completely. Besides, in order to undo the Tr, reading back to logs that are issued at earlier reading start point (an LSN recorded in a CP information file) where the secondary DBMS 111 starts to read is necessary.

<Generating Pseudo-Checkpoint—2>

Figure 4:
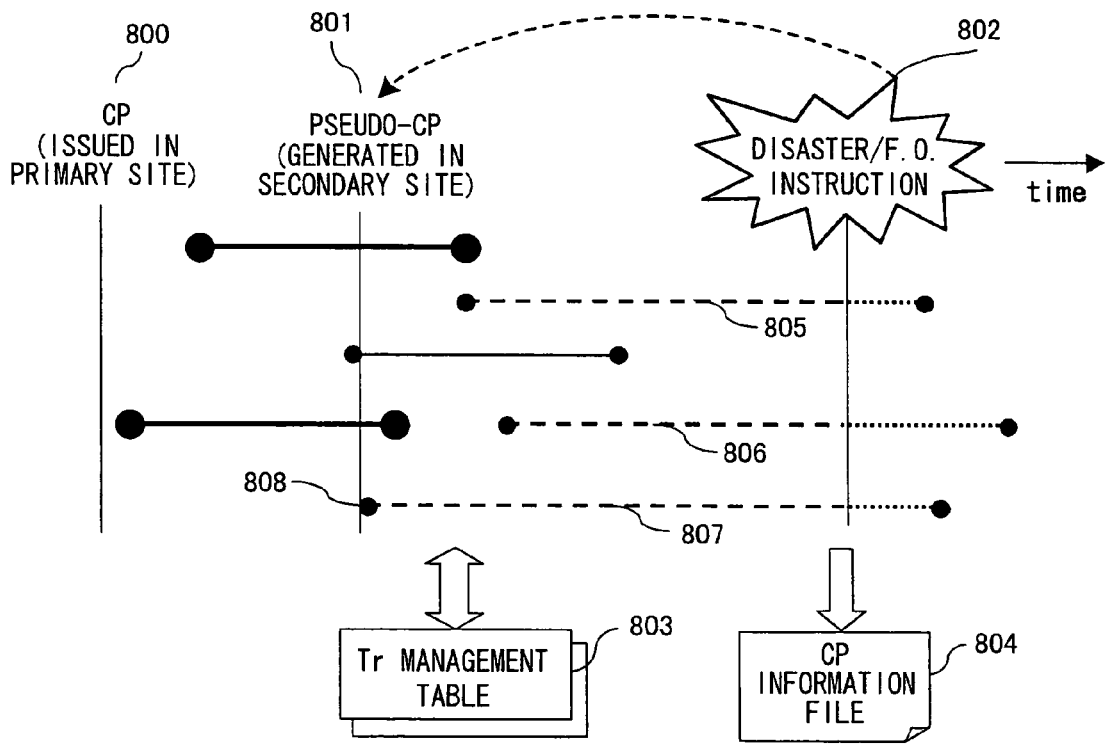
FIG. 4 is an explanatory view showing a case where a pseudo-CP is generated while a transaction executing status is considered and a CP information file is updated.

Second, a procedure for generating a pseudo-CP considering Tr executing conditions and updating a CP information file is described. FIG. 4 shows a schematic view of a CP considering Tr executing conditions. FIG. 4 shows the conditions of applying logs in the subset 500. The solid and the dotted lines with circles show transactions, and the solid lines show committed Trs, and the dotted lines indicate uncommitted Trs at a point 802 when a disaster occurs.

As described above, the method of recording the LSN of logs last applied at the point 802 onto a CP information file 804 is possibly used to inform the secondary DBMS 111 of the applying logs conditions. However, when the method is used, the secondary DBMS 111 should read back to a point prior to the point 802 for undo. Besides, there is a problem in that resuming the DBMS 111 with some limitations is impossible because the applying logs conditions in the subset 500 at the point 802 cannot be reproduced completely. The solutions to the problem are as follows: preventing from reading back earlier to the reading log point at the time of the secondary DBMS 111 startup; and in order to correctly generate the resource information of the finally in the secondary DBMS 111, the start log of Tr that may be finally uncommitted at the point of receiving an F.O. or a stop instruction is regarded as a pseudo-CP.

That is, registering the LSN of a start log (808) of a Tr (807) that has been started in the earliest time among uncommitted Trs (805, 806, 807) at the point 802 when an instruction is received, to the pseudo-CP file, is acceptable. As a result, reading back earlier to the start point is not necessary because the secondary DBMS 111 reads information of the Tr that may be finally undone. Resuming with some limitations also becomes possible. However, the following processes are required to avoid applying the same log 116 more than once: the log LSN applied to data pages or the like has been recorded; and when applying logs, the log LSN to be applied and the LSN to be recorded on data pages are compared.

To realize such a pseudo-CP, it is required to manage uncommitted Tr information in the process of applying logs in the subset 500. For example, managing a Tr table 803 is acceptable. According to the Tr table 803, uncommitted Tr can be informed at the time of receiving an F.O. or a stop instruction.

Figure 5:
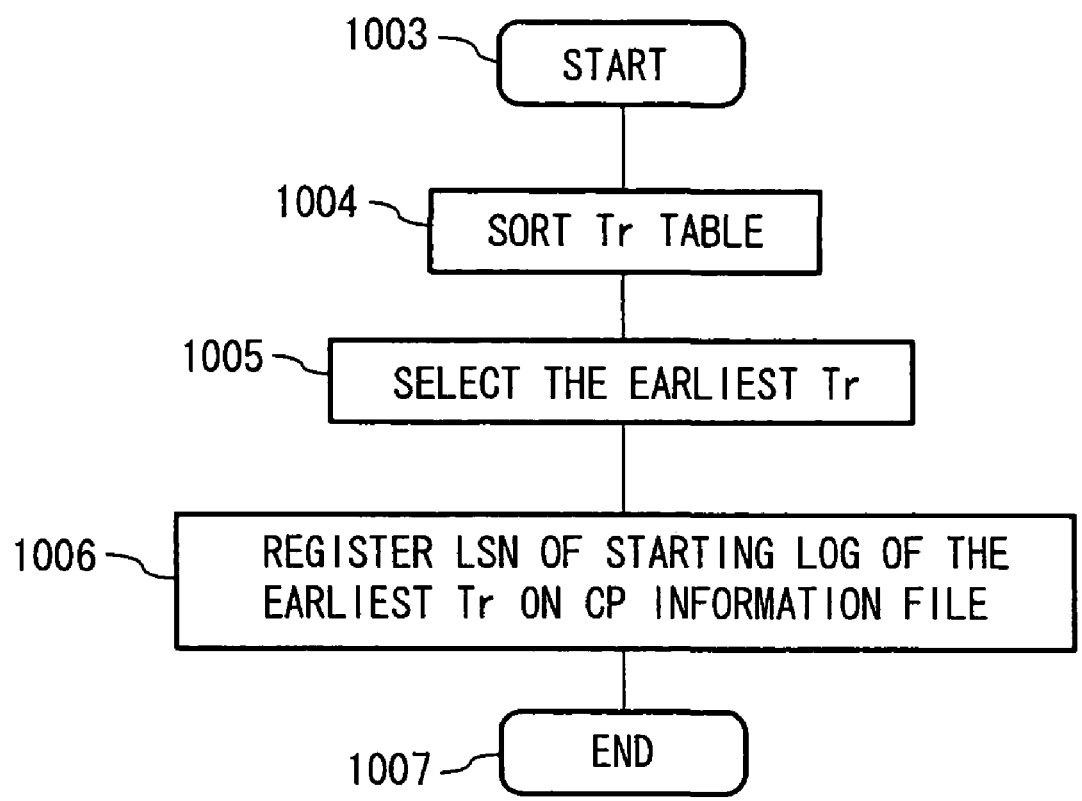
FIG. 5 is a flowchart for a process of a CP information file at a subset.

FIG. 5 shows a flowchart of generating a pseudo-CP in the subset 500 in the case of considering Tr. After an F.O. or a stop instruction is received, the Tr table 803 is scanned to sort the LSN of the start log in a step 1004; the Tr uncommitted and started in the earliest time is found in a step 1005; and finally, the LSN of the uncommitted Tr detected are registered onto CP information file 804 in a step 1006. Through such processes, in the secondary DBMS 111, it is ensured that the Tr that has a possibility of finally being uncommitted can be read from the start log. As a result, reading back to the log reading point is not required, and resuming business with some limitations at the stage where redo is completed will be possible because the resources used by uncommitted Tr can be managed completely.

<Switching from the Subset to the Secondary Server—2>

Figure 6:
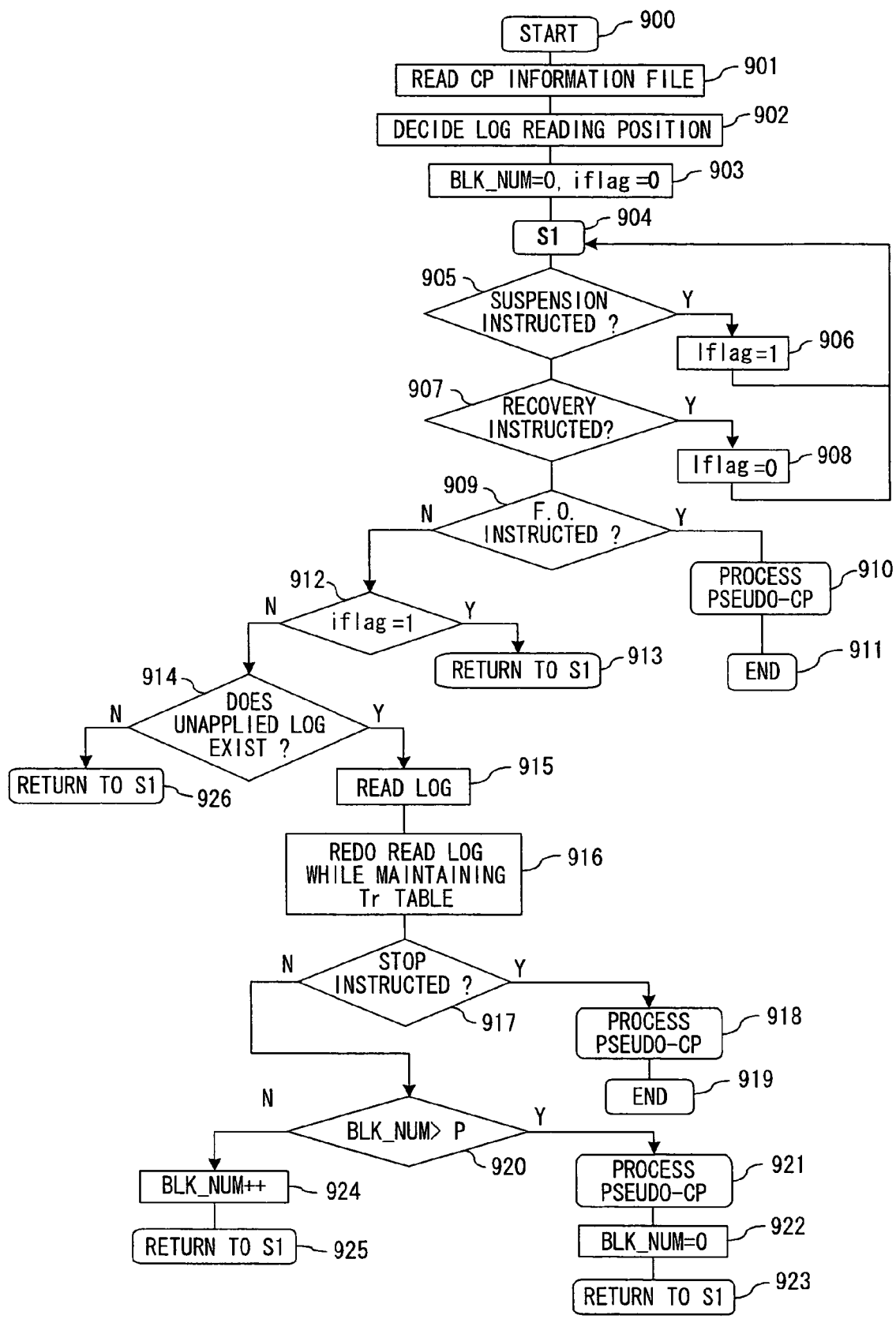
FIG. 6 is a flowchart for takeover process at a subset.

FIG. 6 shows a processing flowchart of the subset that enables to take over the recovery process while being committed in the subset 500, by using such a pseudo-CP described above.

In a step 901, a CP information file is read. In a step 902, a log reading point is decided. The CP information file may be a CP information file generated in the primary site 1 or a CP information file (including pseudo-CP) generated in the subset 500.

The pseudo-CP can be generated when an instruction is issued from a DB administrator or a monitoring program. The pseudo-CP can be also generated when a predetermined period of time has passed or in such an event that a predetermined amount of process is committed. By generating such a pseudo-CP periodically, applying logs can be started from the nearby point where a failure occurred, even when a failure occurs on the subset 500 and the subset 500 needs to be restarted.

The following describes the example that the pseudo-CP is generated when a predetermined amount of log is applied. The variable is set as blk_num, while the threshold is set as P. The blk_num is initialized in a step 903, and i flag described later is also initialized.

The subset 500 has an I/F for receiving instructions of such as interruption, return, F.O., or stop from the management unit 200 etc. The interruption instruction from the management unit 200 etc. means to interrupt applying logs to achieve a standby state, and the return instruction from the management unit 200 etc. means to return from the standby state to resume applying logs. As shown in FIG. 6, interruption/return is controlled with the variable i flag. In steps 905 and 907, the control variable i flag is changed (906, 908) according to the instruction received, then returning to S1 is conducted to execute interruption or return.

In a step 909, the existence of an F.O. instruction is judged. If an F.O. instruction exists, in a step 910, a CP information file is generated with a pseudo-CP as described above. In a step 911, the process is terminated. The CP information file generated enables the secondary DBMS 111 to take over the DB recovery from the subset.

If the F.O. is not instructed, i flag is checked in a step 912. If suspension is instructed and return is not instructed, loop is formed in a step 913.

Figure 17:
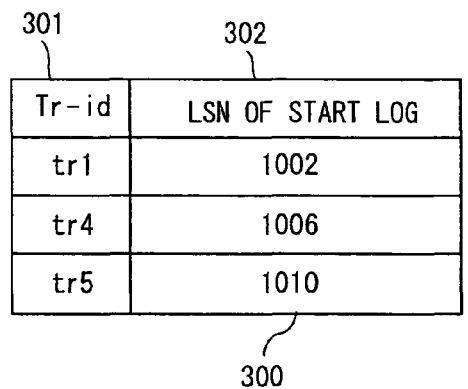
FIG. 17 is an explanatory view of a transaction management table.
Figure 18:
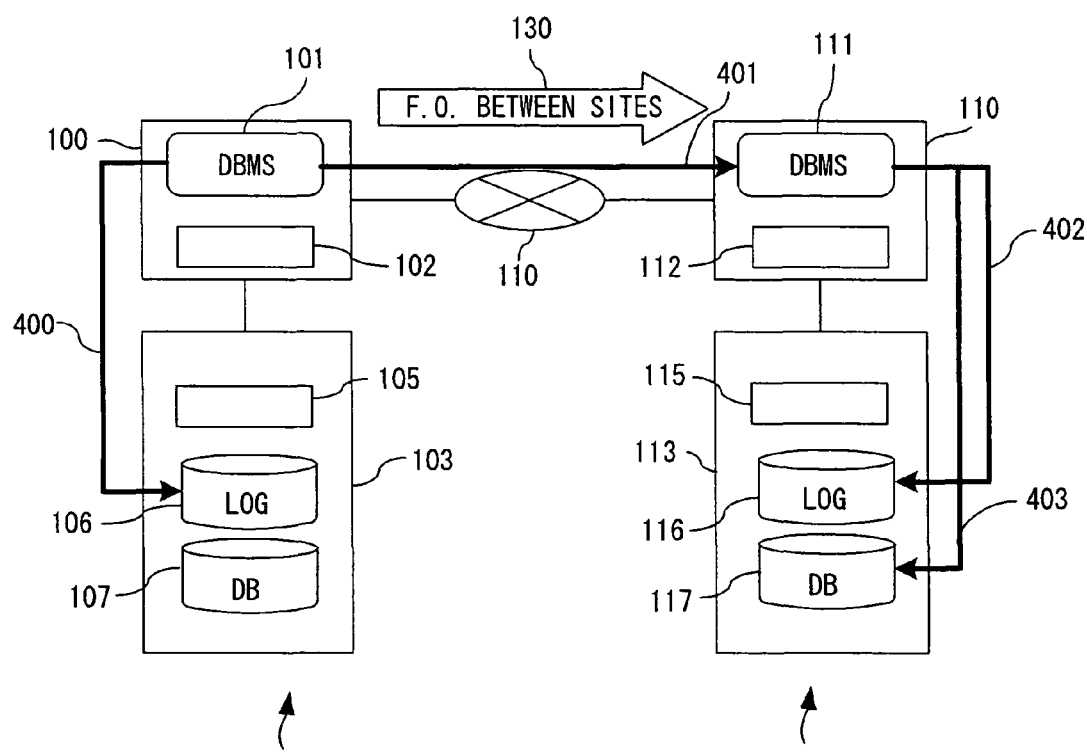
FIG. 18 shows a prior art and a system block diagram in which a log transfer function is incorporated in a DBMS.

If interrupt is not instructed, the existence of the log 116 to be applied is checked in a step 914. If an unapplied log 116 does not exist, the process returns to a step 904 to form loop. If an unapplied log is existent, the log 116 and the transaction table 300 (refer to FIG. 17) are read in a step 915, and the log 116 is applied in a step 916. The log is applied while the transaction table 300 is managed.

In a step 917, the existence of a stop instruction is judged. If stop is instructed due to maintenance or the like, a pseudo-CP is processed to terminate the subset 500 in a step 918. If taking over to an upper-level server is performed during the recovery, undo is not executed. Therefore, the process executed by the F.O. instruction and the process executed by the stop instruction are the same.

If stop is not instructed, the blk_num is checked in a step 920. If the log 116 whose blk_num is equal to or larger than the threshold P specified in advance has been processed, a pseudo-CP is processed in a step 921, blk_num is initialized in a step 922, and loop is formed in a step 923 by returning to the step 904. The pseudo-CP is executed probably because the subset has a failure itself and restarting is required. In this case, when the subset 500 is restarted, in the step 901, the CP information file generated by the subset 500 before the failure occurred, not the CP information file generated in the primary site 1, is read.

If blk_num did not exceed the threshold P, blk_num is incremented in a step 924, and the process returns to the step 904 (S1) in a step 925.

Figure 3:
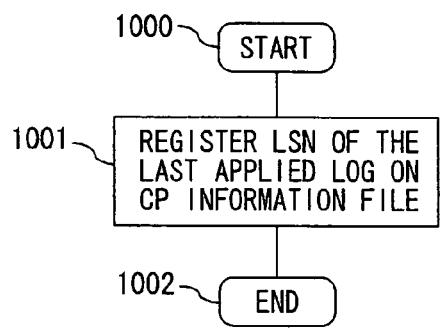
FIG. 3 is a flowchart for a process of a CP information file at a subset.

Either procedure shown in FIG. 3 or FIG. 5 may be used as a method of processing a pseudo-CP. However, if the procedure (shown in FIG. 3) in which a Tr is not considered is used, business with some limitations cannot be resumed in the secondary DBMS 111, so the resuming business time will be delayed. On the other hand, if a Tr is considered as shown in FIG. 5, business can be resumed with some limitations, so it is possible to resume the business immediately.

<Switching from the Subset to the Secondary Server—3>

Figure 7:
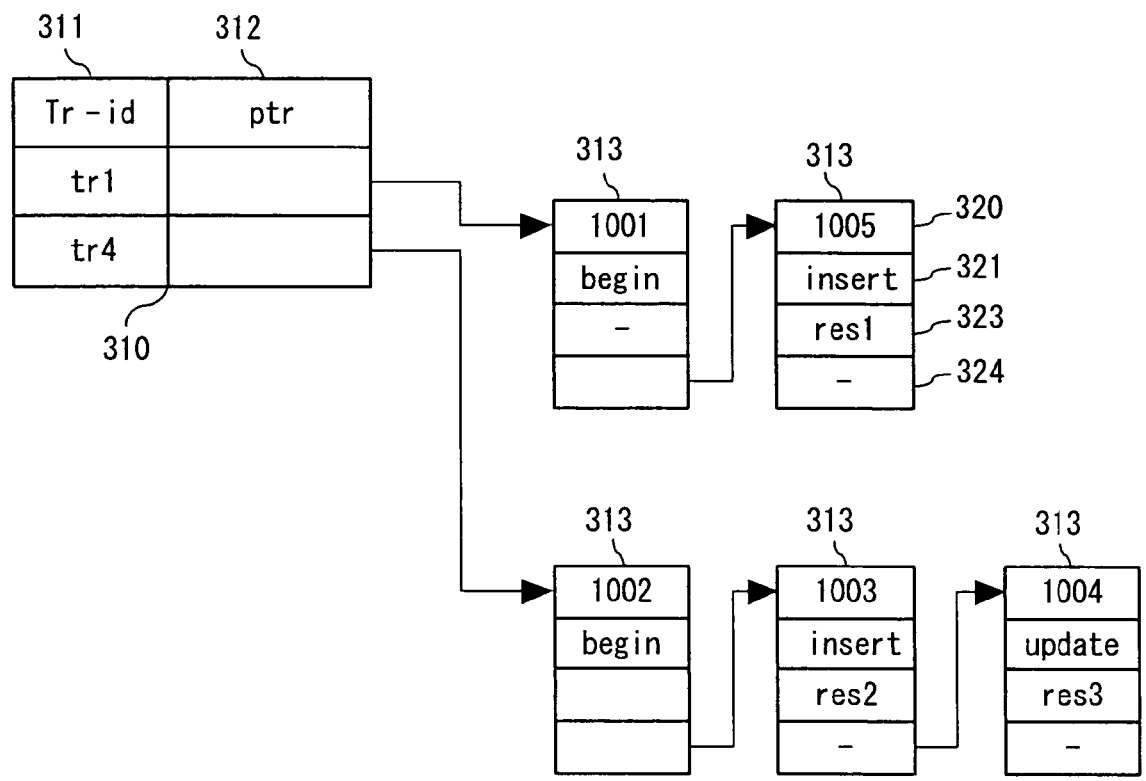
FIG. 7 is an explanatory view showing a constitution of a transaction management table.

As a procedure for takeover of processing to a secondary DBMS in the middle of recovery at a subset 500, there is a method involving defining a completely new I/F (interface), not using a CP information file. For example, a status of the subset 500 at the time of receiving an F.O./a stop instruction may be taken over to an upper-level server (a secondary server 110). The status should include an uncommitted Tr and information about the resource that the uncommitted Tr uses. For example, if uncommitted Tr information is managed in the Tr management table 310 as shown in FIG. 7, it is acceptable to take over the Tr management table 310. A takeover method may be a file or a communication between processes. The transaction management table 310 manages a chain of log information 313 (an LSN 320, a log type 321, resource being used 323) which constitutes the Tr, for each Tr-id 311 which is the identifier of Tr. If the Tr is committed, the corresponding Tr is deleted from the table. Through this operation, a list of the uncommitted Tr is obtained when all logs are applied.

Figure 8:
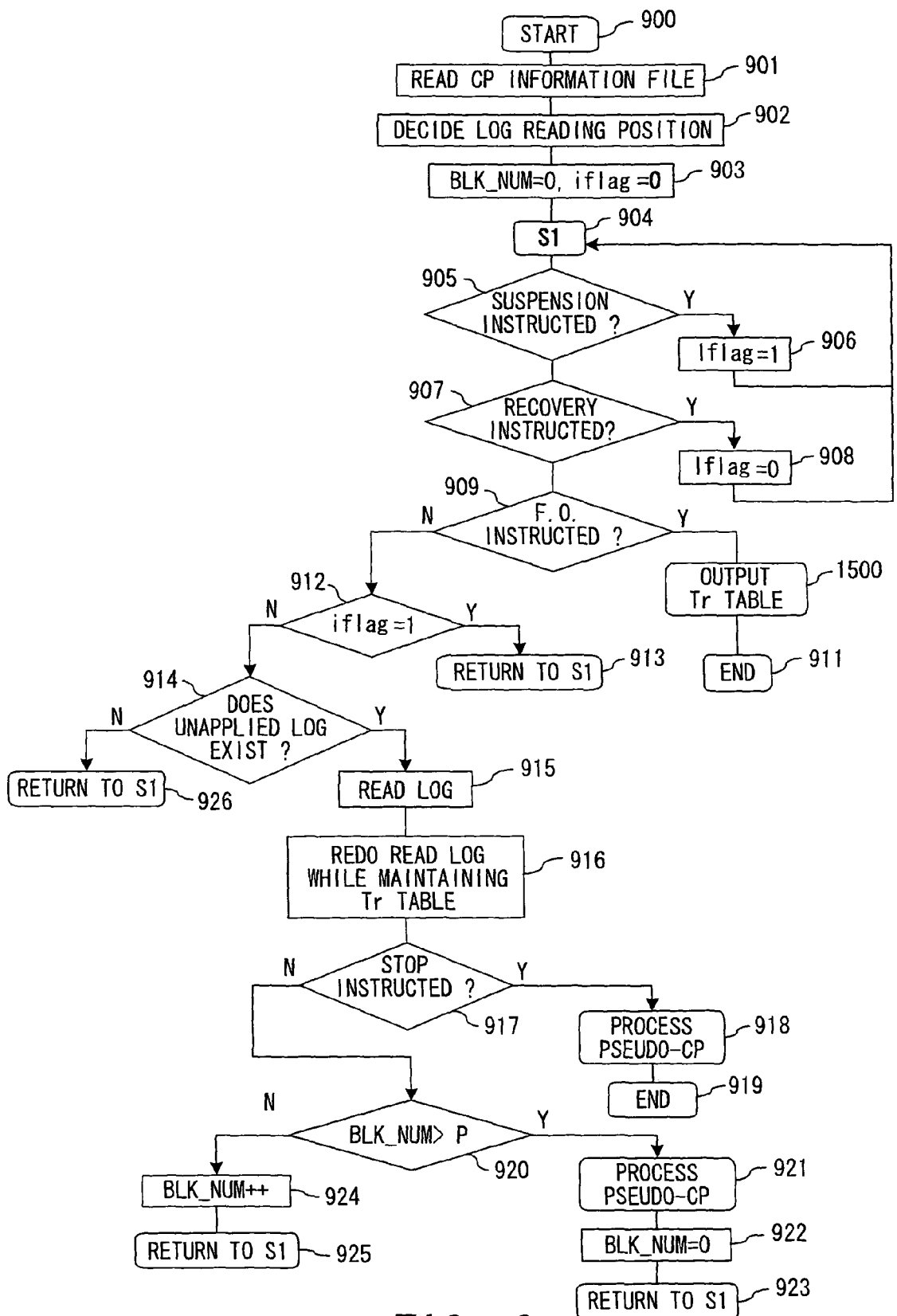
FIG. 8 shows a process of takeover at a subset and is a flowchart for takeover to the secondary server via a file.

FIG. 8 shows a flowchart of the process executed in the subset 500 for taking over the subset 500 status with a file. The basic flow is the same as that when a pseudo-CP is used (shown in FIG. 6). However, if it is judged that an F.O. is instructed in the step 909, the contents of the Tr table are outputted to a file in a step 1500. In the case of a stop instruction, takeover to an upper-level server is not executed. Because the major purpose is to restart the subset, a pseudo-CP is generated.

Figure 9:
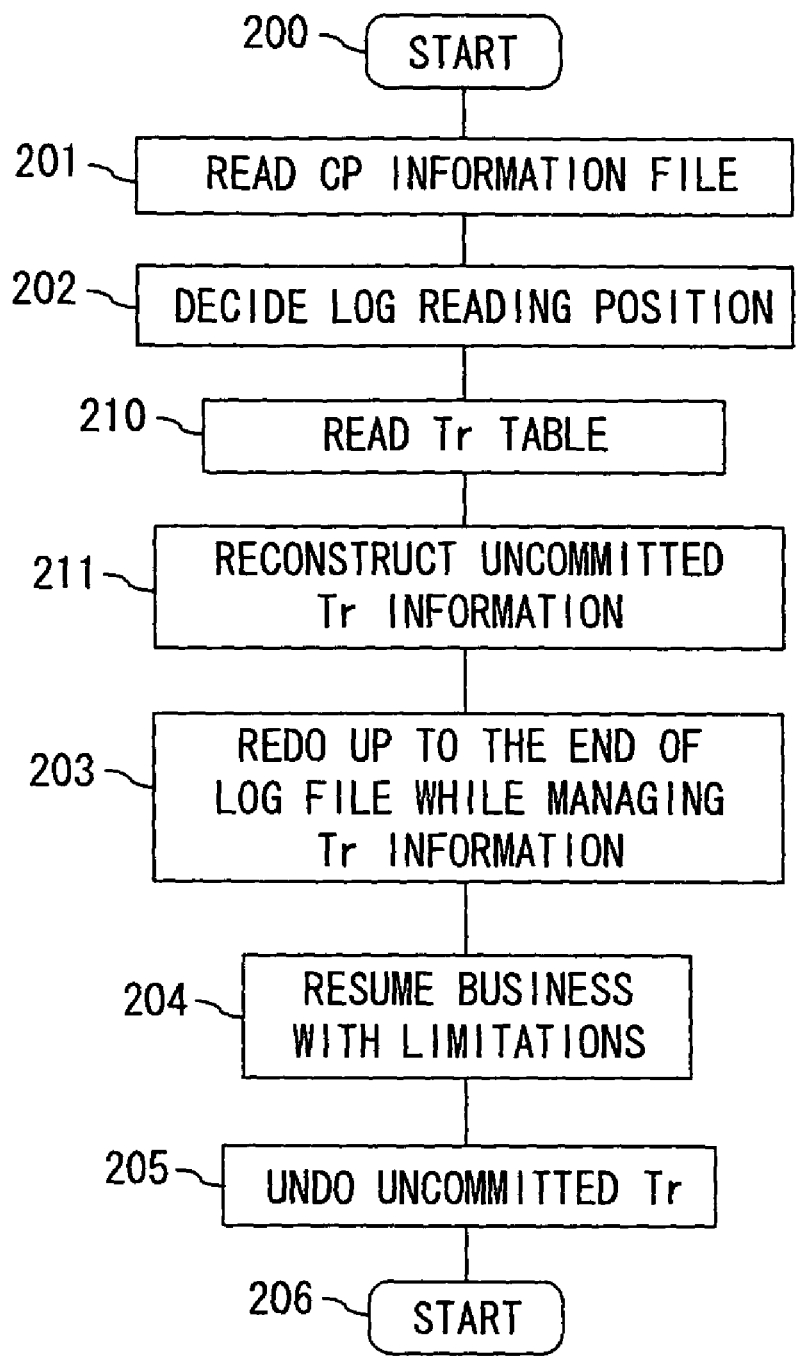
FIG. 9 is a flowchart for starting a secondary DBMS at a secondary site.

If a new I/F is defined, the startup flow of the secondary DBMS 111 should be modified. The startup flow is shown in FIG. 9. In the steps 201 and 202, a log reading position is determined according to a CP information file in the setting file 512 in the secondary storage system 113. In a step 210, if a file (including information on the Tr table) outputted by the subset 500 exists, the file is read. In a step 211, information on the uncommitted Tr is reconstructed according to the file. That is, the resource that is used for the uncommitted Tr is clarified and locked. In the step 203 or later, applying log is started. Logs are applied while the Tr table is managed or exclusive information on an uncommitted Tr is managed. When logs are applied up to the end of the log 116, business is resumed with some limitations based on exclusive-information that has been constructed so far. That is, accessing the uncommitted Tr is prohibited to process other transactions. In a step 205 or later, undo is processed in parallel with resuming business. When all undo processes are completed, the limitations are removed to resume business completely.

<Switching from the Subset to the Secondary Server—4 After Complete Recovery>

As a procedure for switching from a subset 500 to a secondary server 110 in the secondary site 2, takeover to an upper-level server in the middle of the recovery at the subset 500 is described above. In addition, there is another method involving taking over a process to an upper-level server (the secondary server 110), after entire recovery is completed in the subset 500. The following describes the case of taking over a process to an upper-level server after entire recovery in the subset 500 is completed.

Figure 10:
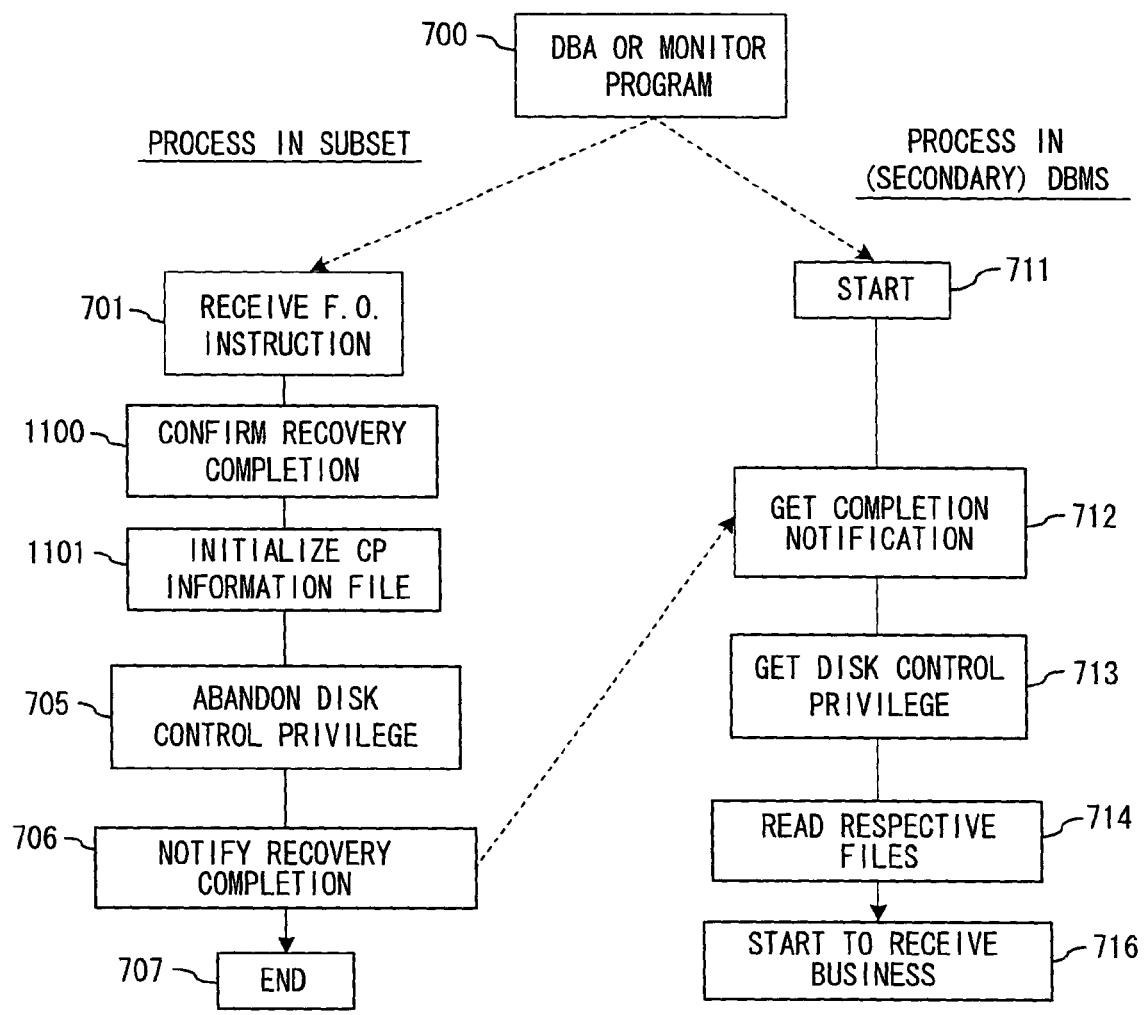
FIG. 10 shows a process at a subset and a secondary DBMS at fail-over, and is a flowchart for completing DB recovery at the subset.

FIG. 10 shows a flow of takeover between the subset 500 and the secondary server 110.

First, in the step 700, an F.O. instruction is decided in the management unit 200 or the like. This decision can be made by a DB administrator or automatically made by a monitoring program. In a step 701, the subset 500 receives the F.O. instruction. Receiving can be made via a communication between processes or a file.

In a step 1100, Trs with consistency in a DB 117 and all recovery process completions are confirmed. In a step 1101, a CP information file in the setting file 512 is initialized. This is because all recovery is completed and the upper-level server does not have to continue the recovery process.

In the step 705, a disk control privilege of the subset 500 is abandoned. In the step 706, completion of the recovery is notified to the upper-level server (the secondary server 110).

In the secondary server 110, an F.O. is decided, and if the DBMS 111 has not started yet, the DBMS 111 first starts in the step 711. By this startup, startup is made up to the point prior to the disk accessing. In a step 712, the DBMS waits for the recovery completion notice from the subset. A method of this notice may be a file connection, a communication between processes, or an instruction by a DB administrator. After the recovery completion is confirmed, in the step 713, a disk control privilege is obtained. In the step 714, the secondary storage system 113 is mounted on the secondary server 110 and each file is read. In the step 716, business starts to be received.

In order to complete the DB recovery in the subset 500 described above, a following method is considered: after redo is completed up to the log end as in the normal DB server, undo is executed. Alternatively, logs are applied while Trs are considered in the process of applying logs in the subset 500. That is, committed/uncommitted Trs are managed and only committed Trs are redo, so that undo is not necessary.

<The DB Recovery Process at the Subset 1>

Figure 11:
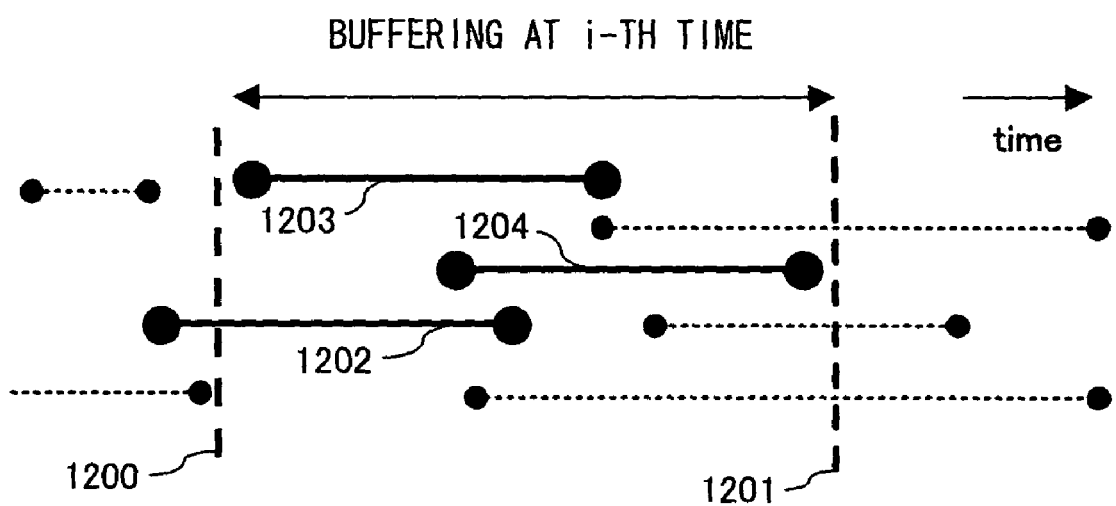
FIG. 11 is an explanatory view showing redo only committed transactions.

FIG. 11 is the schematic drawing in the case where only committed Trs are redo. FIG. 11 shows a process of applying logs at the subset 500 in order of occurrence. The lines with circles indicate Trs, each of which is concurrently processed. The subset 500 buffers a log 116, analyses the buffered log 116, and only committed Trs are redo.

FIG. 11 shows the state where logs 116 from the time 1200 to the time 1201 are buffered. The buffered logs 116 are analyzed per Tr. Only Trs 1202, 1203, and 1204 committed during this period are redo. Trs committed at the time 1201 or later are redo by a subsequent buffering and a subsequent analysis.

The following describes a process flow in the subset 500 when DB recovery is completed in the subset 500.

Figure 12:
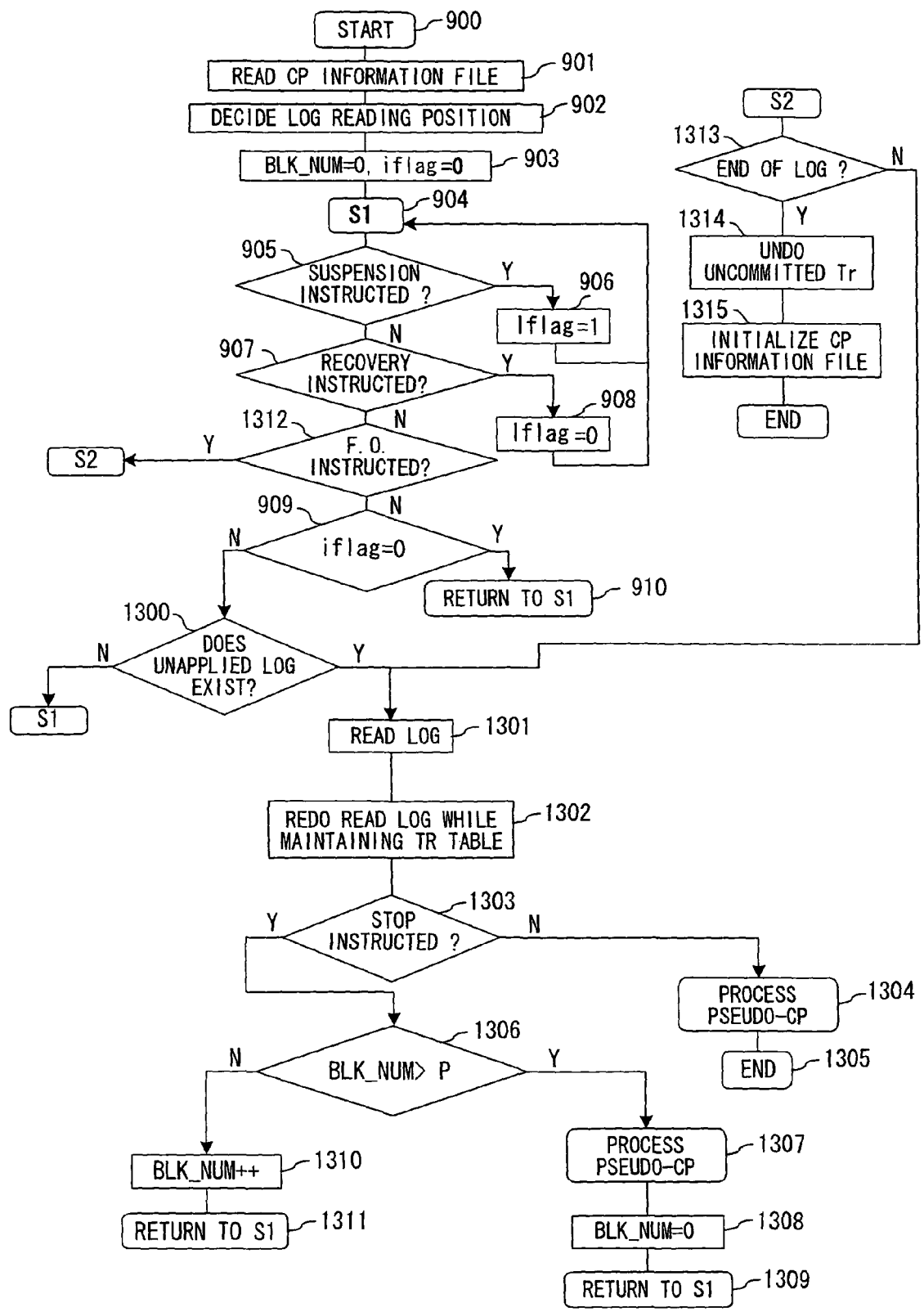
FIG. 12 is a flowchart for recovery and takeover processes at a subset.

Firstly, FIG. 12 shows a process flow showing up to the end of a log 116 is redo as usual, and then undo.

In the steps 901 and 902, a log reading point is decided by accessing a CP information file. In the step 903, a variable for processing a pseudo-CP etc. is initialized. The following shows an example that a pseudo-CP is issued when a certain amount of log is processed. The pseudo-CP may be issued at another timing, for example, when a certain period of time has passed.

In the steps 905 and 907, the existence of a suspension/return instruction is checked. If the suspension instruction exists, a value is set to i flag. While the i flag is ON (i flag=1), loop is formed as in FIG. 6 and a log applying process is suspended. If return is instructed, the i flag is set to 0, so the loop ends and a subsequent process is executed.

If the state is not a suspended state, the existence of an unapplied log 116 is checked in a step 1300. If an unapplied log exits, the log is read in a step 1301 and a DB is updated while the log is applied in a step 1302. A Tr table is updated at the same time. In a step 1303, the existence of a stop instruction is checked. If stop is instructed, a pseudo-CP is processed in a step 1304. In a step 1305, the process at the subset is terminated. This stop is made when a subset temporarily needs to be shutdown because of an operational reason such as replacing hardware in which the subset operates.

If stop is not instructed, it is checked whether a certain amount of log is applied or not in a step 1306. If a certain amount of log is applied, a pseudo-CP is processed in a step 1307. In a step 1308, a variable is initialized. If a certain amount of log is not applied, the variable is incremented in a step 1310, and the process returns to the step 904.

If an unapplied log does not exist and an F.O. instruction is confirmed in a step 1312, the completion of applying log up to the end of the log 116 is judged in a step 1313. If the application is completed, uncommitted Trs are undo in a step 1314. After the completion of the undo process, a CP information file is initialized. If a log is not applied to the end of the log 116, the process returns to the step 1301 and all logs are applied.

<The DB Recovery Process at the Subset 2>

Figure 13:
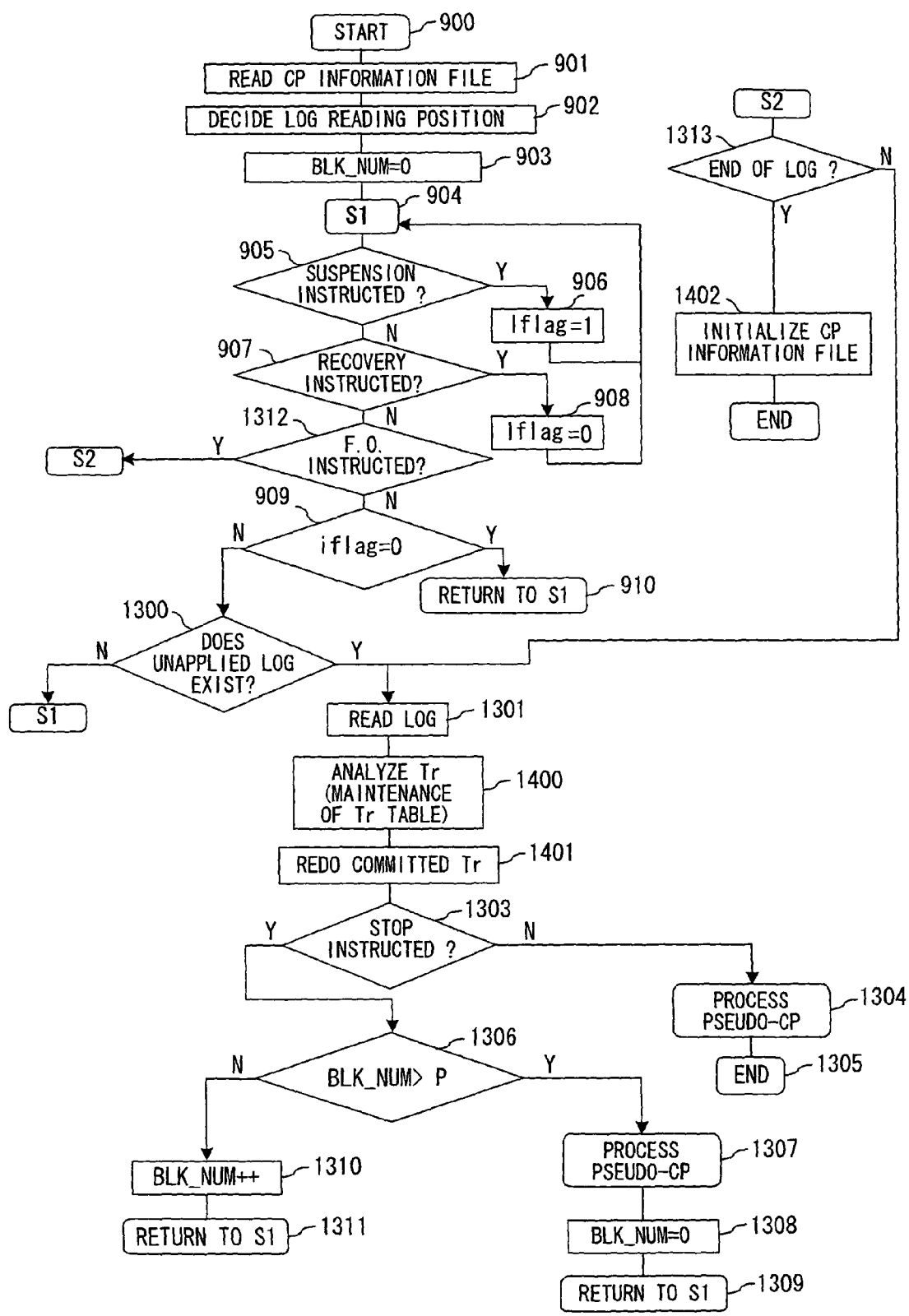
FIG. 13 is a flowchart for another process of recovery and takeover at a subset.

As a procedure for completing DB recovery at a subset, FIG. 13 shows a process flowchart in which a committed/uncommitted state of a Tr is managed in the process of applying logs and only committed Trs are redo. The basic flow is the same as that shown in FIG. 12. The difference from FIG. 12 is the process where an unapplied log exists: in the step 1301, a log is read (and buffered); in a step 1400, a Tr is analyzed and a committed Tr is judged; in a step 1401, only a committed Tr is redo.

A process at the time when an F.O. instruction is received also differs: in the step 1312, an F.O. instruction is confirmed; in the step 1313, whether up to the end of a log 116 is read or not is judged; in a step 1402, a CP information file is initialized to terminate the process. Regarding the log 116 that has been already read, the logs relating to the committed Tr at that time are applied and the logs relating to the uncommitted Tr are not applied. Therefore, it is possible to immediately terminate the process without undo. Because a DB recovery process is not required in the secondary DBMS 111, the CP information file may be left initialized.

<Conclusion>

As described above, the two sites 1 and 2 (primary and secondary) are provided. In normal operations, through the disaster recovery system which enables to copy data in the primary site 1 into the secondary site 2, only the log 106 in the primary site 1 is copied into the secondary storage system 113 in the secondary site 2 using the remote copy function in the storage system 103. The secondary site 2 is provided with the exclusive unit 501 which controls the secondary storage system 113. On the exclusive unit 501, the subset 500 which has only a part of the DBMS, for example, a log application function, is operated. The subset 500 is recovered with the log 116 stored in the secondary storage system 113 in the secondary site 2 that remote-copied. The DB 117 in the secondary site is recovered with the log 116 that copied.

Therefore, the secondary server 110 is not required in normal operations and only the exclusive unit 501 including the resource which enables to apply logs must be operated. For that reason, the capacity to process transactions such as the secondary server 110 is not required and it would be possible to reduce the operational costs in normal operations by constituting the exclusive unit 501 with a small computer.

When fail-over occurs, the service can be resumed by: adding secondary server 110 into the secondary site 2; and taking over the completely recovered DB 117 or the recovery process of the DB 117 from the subset 500 to the started DBMS 111 in the secondary server 110.

When a disaster occurs, in order to execute in the secondary site 2 the same process as the process on the business conducted in the primary site 1 in normal operations, the business is conducted in the secondary DBMS 111, which is an upper-level unit, on the secondary server 110. Therefore, the conventional switch 130 between sites and the switch 505 between the systems in the secondary site are required.

To realize the switch 130 between sites, the subset 500 is provided with a switch mechanism 505 in the site.

Switching from the subset 500 in the secondary site 2 to the secondary server 110 is summarized as follows.

1. Taking over to an upper-level server (a secondary server 110) during recovery at a subset 500 (fail-over in the site)
   1-1 Takeover through a pseudo-CP information file not considering a Tr executing status
   1-2 Generating a pseudo-CP while considering a Tr executing status to update a CP information file
   1-3 Takeover through a Tr management table 310
2. Taking over to an upper-level server after completing entire recovery of the DB 117 at a subset 500
   2-1 Performing undo after up to the end of a log is redo
   2-2 Applying logs while considering Trs and only committed Trs are redo As described in 1 above, the process is taken over during recovery at the subset 500 to the secondary server 110 through the pseudo-CP or the transaction management table 310. That is, the process is immediately taken over to the secondary server 110, which has higher performance than the exclusive unit 501 in which the subset 500 is operated. Therefore, the overhead before resuming the business can be reduced because the recovery of the DB is executed quickly.

As described in 2 above, if logs are applied to the end of the log 116 when fail-over is instructed, the process can be immediately taken over to the secondary server 110.

As described above, protecting the data and maintaining the on-line performance can be both managed even in the event of a wide area disaster because logs are only targeted as the synchronous. Besides, by off-loading the log application unit to the intermediate exclusive unit 501, server less is realized in normal operations. Therefore, the DR system suitably corresponding to a wide area disaster can be constructed with lower cost.

A switching mechanism between the subset 500 and the secondary DBMS can provide reasonable constitution during normal operations. In the event of a disaster or during a planned system shutdown, switching control from the subset to the secondary server can make the secondary site 2 process the same business amount as that during normal operations.

In the secondary site 2, it is possible to take over the process to the secondary server 110 while the recovery at the subset 500 is being processed by managing CP information independently of the primary site 1. As a result, the rest of the recovery can be executed in the secondary server 110 which has rich resources. Besides, because the recovery with some limitations is possible, the time before resuming the business can be reduced.

Furthermore, because the Tr management is executed in the subset 500, and the recovery is executed so that there is consistency in Trs, undo processing is not necessary at takeover. Since an upper-level server does not have to execute any recovery process, the operation in the upper-level server can be done easily.

Second Embodiment

Figure 14:
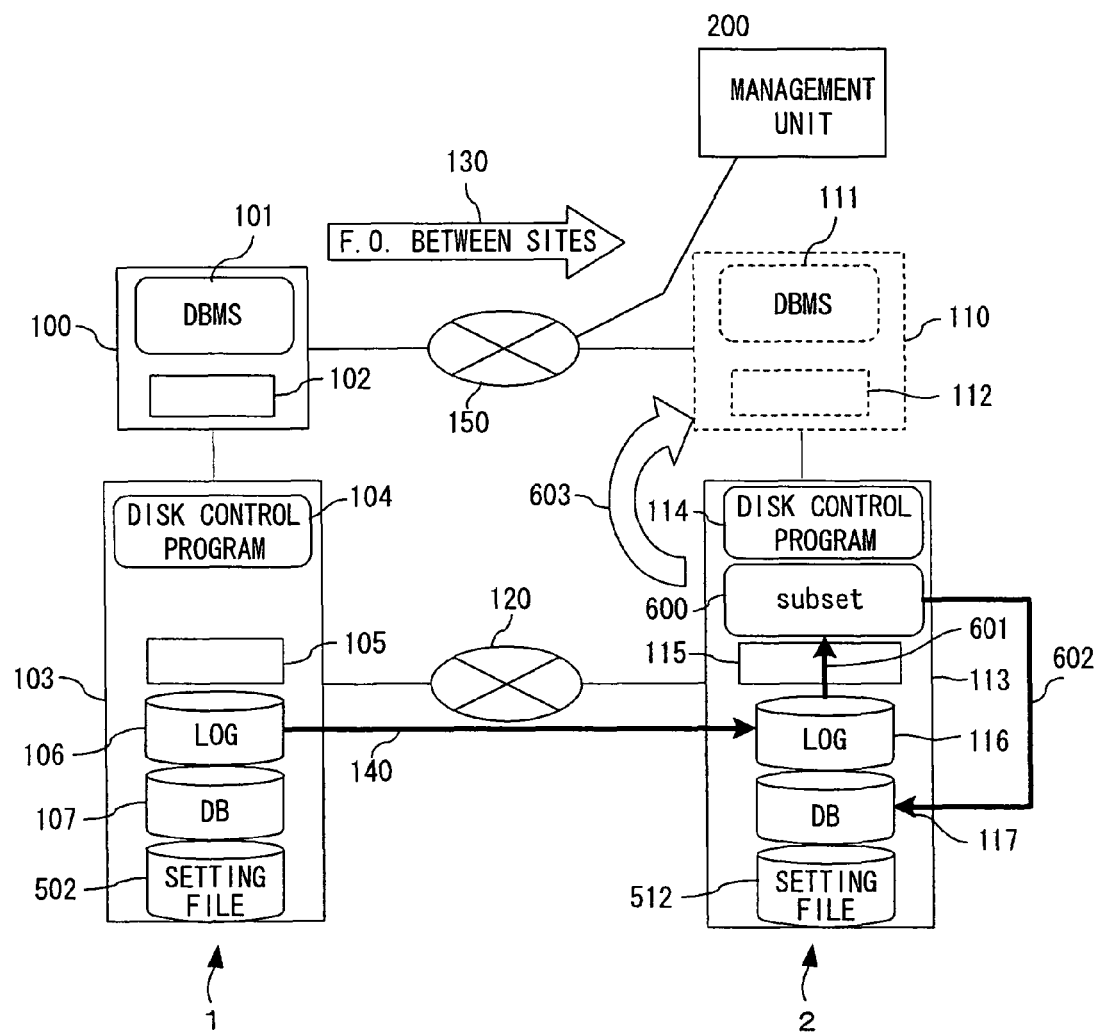
FIG. 14 shows a second embodiment and is a system block diagram, in which a subset is stored in a storage system, showing disaster recovery at two sites.
Figure 15:
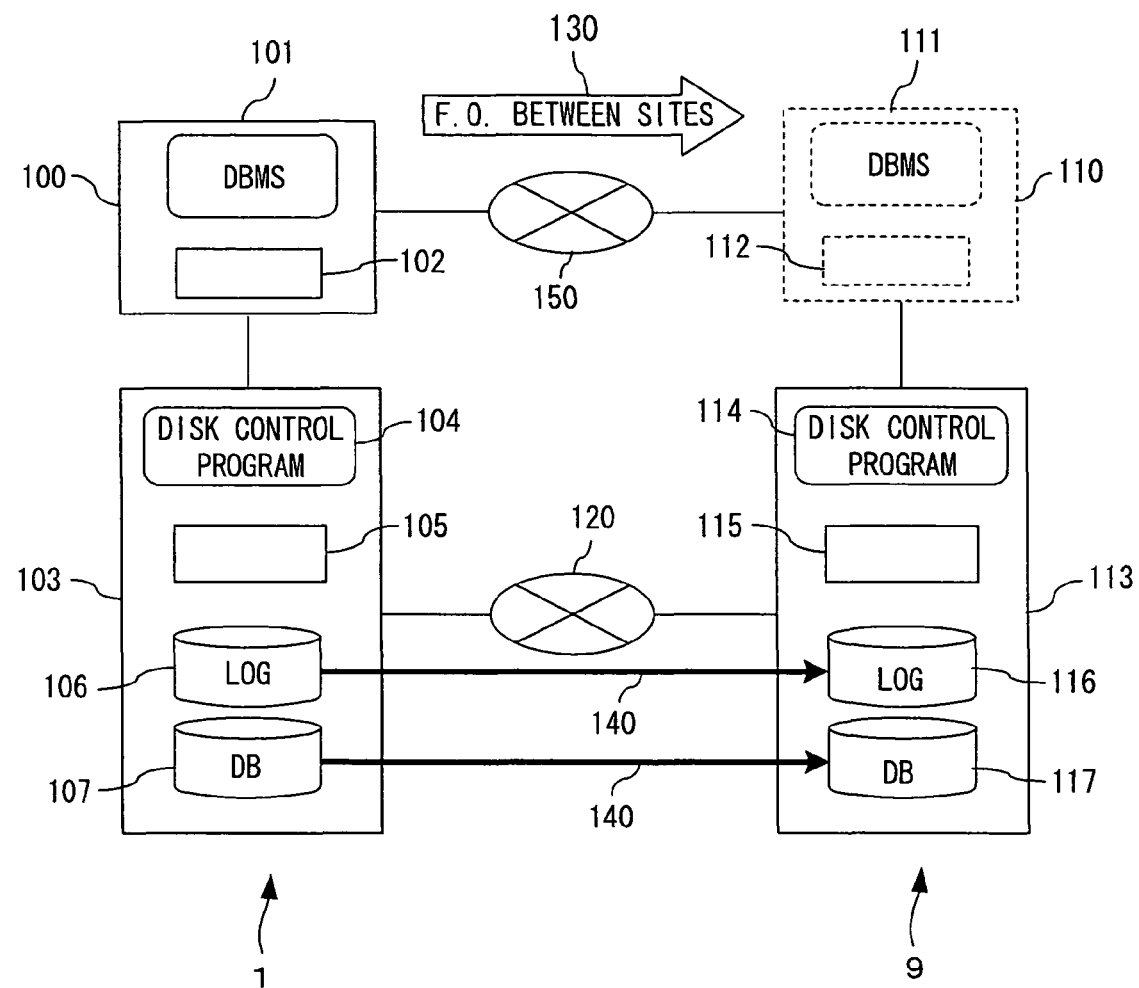
FIG. 15 shows a prior art and a system block diagram of a disaster recovery system with a remote copy.
Figure 16:
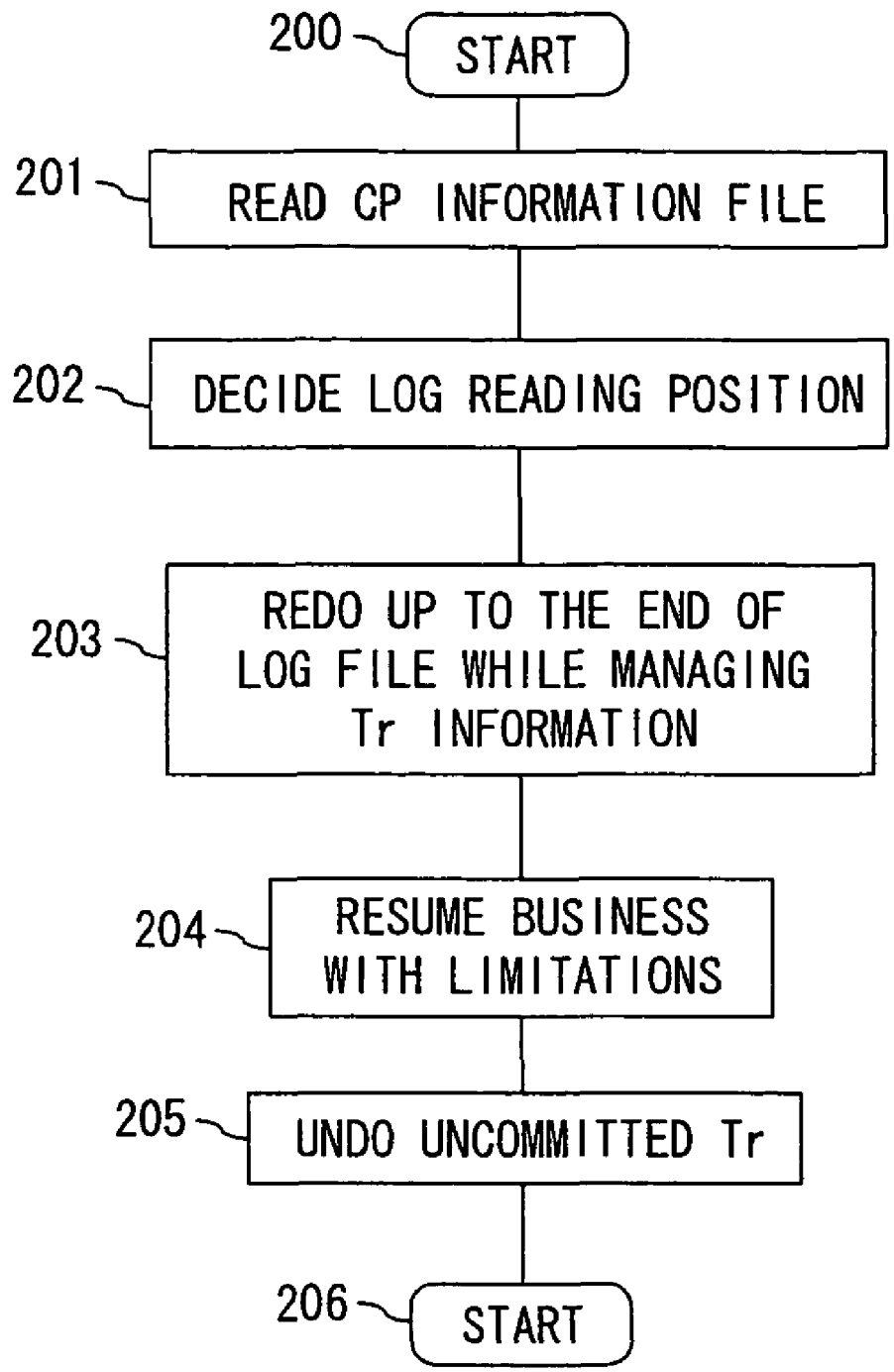
FIG. 16 shows a prior art and a flowchart of a DB recovery process at a checkpoint as a starting point.

FIG. 14 shows a second embodiment in which the subset of the first embodiment is located in a secondary storage system 113, not in the intermediate exclusive unit.

A subset 600 in the figure has also only a part of function (log recovery function) of the DBMS 111 in the secondary site 2 as in the first embodiment. The secondary storage system 113 has a CPU and memory (not shown), and the subset 600 is operated using such resources.

By locating the subset 600 in the secondary storage system 113, the high speed network (a network between storages 120) is available, so speeding up the log application process is possible.

If an exclusive unit 501 is used to operate the subset as in the first embodiment, it is required to connect between the secondary storage system 113 and the exclusive unit 501 via an FC switch or the like. Meanwhile, if the subset 600 is located in the secondary storage system 113, such connection is not required and the constitution and setting up of the system can be simplified. Besides, recovery in which the DB 117 level is considered can be performed in a storage system, a DB recovery process is not necessary from a user standpoint. Therefore, the operation can be realized easily moreover.

In this case also, because the secondary server 110 is not necessary in normal operations, low-cost operation is possible. However, in the event of a disaster, continuing business at the subset in the storage system is difficult in order to execute the same amount of process as that before the disaster because the business should be continued in the secondary site 2. Besides, if the subset 600 is limited to application of logs, the business cannot be received. Therefore, in the event of a disaster, it is required to startup the secondary server 110 equal to the primary site 1 to continue the business in the secondary server 110. For that reason, not only the conventional system switch 130 between the primary site and the secondary site but also a switch in the secondary site 603 between the subset 600 and the secondary server 110 (the subset is off-loaded to the storage system) are required.

The switch in the site 603 is similar to that in the first embodiment. As in the 1-1 and 1-2 in 1. described above, takeover to an upper-level server (secondary server 110) in the middle of recovery at the subset 600 (fail-over in the site) or after entire recovery in the DB 117 is completed as in 2. described above is possible.

In this embodiment, the exclusive unit 501 in the first embodiment is not necessary. In normal operations, only the secondary storage system 113 must be operated in the secondary site 2. Therefore, the operation cost for the secondary site 2 can be reduced further.

A Network Attached Storage (NAS) or the like can be adopted as the secondary storage system 113.

In this invention according to claim 1 above, the first system and the second system are connected via the storage network between the first storage system and the second storage system described above, and the server network between the first computer and the intermediate unit or the second computer described above.

As described above, this invention can reduce the operational costs in a secondary site and apply the technology to a disaster recovery system adopted in the financial sectors, major enterprises, and the like.

While the present invention has been described in detail and pictorially in the accompanying drawings, the present invention is not limited to such detail but covers various obvious modifications and equivalent arrangements, which fall within the purview of the appended claims.

What is claimed is:

1. A data recovery and takeover method in a disaster recovery system including a primary site having a first storage system storing a first database and a first server provided with a first database management system (DBMS) managing the first database, and a secondary site, located remotely from the primary site, having a second storage system storing a second database which duplicates the first database and a recovery module, the method comprising:

copying a log indicating an update difference in said first database into a log file formed in the second storage system by a remote copy via an inter storage network which connects the first storage system and the second storage system, when the update difference is generated in said first database;

when the log indicating the update difference is copied by the remote copy, reading out the copy of the log from the log file formed in the second storage system by the recovery module and applying the log on said second database by the recovery module, in a log applying process which is kept alive until the second site receives a failover instruction;

upon a time when the second site receives the failover instruction, interrupting the log applying operation of the data recovery process and marking a log record indicating a start of an oldest uncommitted transaction at that time as a check point;

according to the failover instruction, starting in the secondary site a second server which is provided with a second DBMS which is to take over the first DBMS;

informing the second server of execution condition of the interrupted data recovery process including information of the check point from the recovery module, taking over by the second DBMS provided in the second server a data recovery of the second database.

2. The data recovery and takeover method according to claim 1, wherein the DBMS that is taking over the data recovery of the second database executes the log applying operation until a completion up to an end of logs copied in said log file, and undoes every uncommitted transactions by reading out logs from the log file in a range up to the check point.

3. A data recovery and takeover method in a disaster recovery system including a primary site having a first storage system storing a first database and a first server provided with a first database management system (DBMS) managing the first database, and a secondary site, located remotely from the primary site, having a second storage system storing a second database which duplicates the first database and a recovery module, the method comprising:

copying a log indicating an update difference in said first database into a log file formed in the second storage system by a remote copy via an inter storage network which connects the first storage system and the second storage system, when the update difference is generated in said first database;

when the log indicating the update difference is copied by the remote copy, reading out the copy of the log from the log file formed in the second storage system by the recovery module, and applying the log on said second database by the recovery module, in a log applying process which is kept alive until the second site receives a failover instruction;

when the second site receives the failover instruction, continuing the log applying operation until a completion up to an end of the logs copied in said log file, and undoing logs concerned in uncommitted transactions by the recovery module;

according to the failover instruction, starting in the secondary site a second server which is provided with a second DBMS which is to take over the first DBMS; and after confirming a completion of the log applying operation and undoing the logs concerned in the uncommitted transactions, informing the second server of a completion of the data recovery process from the recovery module.

4. The data recovery and takeover method according to claim 3, wherein said starting is executed concurrently with said continuing the log applying operation and undoing the logs concerned in the uncommitted transactions.

5. A data recovery and takeover method in a disaster recovery system including a primary site having a first storage system storing a first database and a first server provided with a first database management system (DBMS) managing the first database, and a secondary site, located remotely from the primary site, having a second storage system storing a second database which duplicates the first database and a recovery module, the method comprising:

copying a log indicating an update difference in said first database into a log file formed in the second storage system by a remote copy via an inter storage network which connects the first storage system and the second storage system, when the update difference is generated in said first database;

when the log indicating the update different is copied by the remote copy, reading out the copy of the log from the log file and buffering the log;

analyzing buffered logs to find committed transactions;

applying the logs concerned in the committed transactions on said second database by the data recovery process;

when the second site receives the failover instruction, continuing the log applying operation until a completion up to an end of logs copies in said log file by said recovery module;

according to the failover instruction, starting in the secondary site a second server which is provided with a second DBMS which is to take over the first DBMS; and after confirming a completion of the log applying operation, informing the second server of a completion of the data recovery process from the recovery module.

6. The data recovery and takeover method according to claim 5, wherein said starting is executed concurrently with said continuing the log applying operation.

7. The data recovery and takeover method according to claim 1, wherein the recovery module is a dedicated module configured to provide limited DBMS service of the reading out the copy of the log from the log file and the applying the log on said second database by a data recovery process, before the starting of the second server provided with the second DBMS responsive to the failover instruction.

8. The data recovery and takeover method according to claim 3, wherein the recovery module is a dedicated module configured to provide limited DBMS service of the reading out the copy of the log from the log file and the applying the log on said second database by a data recovery process, before the starting of the second server provided with the second DBMS responsive to the failover instruction.

9. The data recovery and takeover method according to claim 5, wherein the recovery module is a dedicated module configured to provide limited DBMS service of the reading out the copy of the log from the log file and the applying the log on said second database by a data recovery process, before the starting of the second server provided with the second DBMS responsive to the failover instruction.

10. The data recovery and takeover method according to claim 1, wherein the recovery module is a dedicated module configured to provide limited DBMS service of the reading out the copy of the log from the log file and the applying the log on said second database by a data recovery process, before the starting of the second server provided with the second DBMS responsive to the failover instruction, and where the recovery module is configured to continue operating during the starting of the second server provided with the second DBMS.

11. The data recovery and takeover method according to claim 3, wherein the recovery module is a dedicated module configured to provide limited DBMS service of the reading out the copy of the log from the log file and the applying the log on said second database by a data recovery process, before the starting of the second server provided with the second DBMS responsive to the failover instruction, and where the recovery module is configured to continue operating during the starting of the second server provided with the second DBMS.

12. The data recovery and takeover method according to claim 5, wherein the recovery module is a dedicated module configured to provide limited DBMS service of the reading out the copy of the log from the log file and the applying the log on said second database by a data recovery process, before the starting of the second server provided with the second DBMS responsive to the failover instruction, and where the recovery module is configured to continue operating during the starting of the second server provided with the second DBMS.

13. The data recovery and takeover method according to claim 1, wherein the recovery module is a dedicated module configured to provide limited DBMS service of the reading out the copy of the log from the log file and the applying the log on said second database by a data recovery process, before the starting of the second server provided with the second DBMS responsive to the failover instruction, where the recovery module is a different component from the second server.

14. The data recovery and takeover method according to claim 3, wherein the recovery module is a dedicated module configured to provide limited DBMS service of the reading out the copy of the log from the log file and the applying the log on said second database by a data recovery process, before the starting of the second server provided with the second DBMS responsive to the failover instruction, where the recovery module is a different component from the second server.

15. The data recovery and takeover method according to claim 5, wherein the recovery module is a dedicated module configured to provide limited DBMS service of the reading out the copy of the log from the log file and the applying the log on said second database by a data recovery process, before the starting of the second server provided with the second DBMS responsive to the failover instruction, where the recovery module is a different component from the second server.

16. A data recovery and takeover method in a disaster recovery system including a primary site having a first storage system storing a first database and a first server provided with a first database management system (DBMS) managing the first database, and a secondary site, located remotely from the primary site, having a second storage system storing a second database which duplicates the first database and normally not having an operational second server, the method comprising:

copying a log indicating an update difference in said first database into a log file formed in the second storage system by a remote copy via an inter storage network which connects the first storage system and the second storage system, when the update difference is generated in said first database;

using a recovery module at the secondary site, where the recovery module is a surrogate component different from, and providing fewer DBMS services than, the first and second servers, the recovery module being operational full-time to read out the copy of the log from the log file formed in the second storage system by the recovery module, and apply the log on said second database by the recovery module, in a log applying process, until the second site receives a failover instruction;

when the second site receives the failover instruction, continuing the log applying operation until a completion up to an end of the logs copied in said log file, and undoing logs concerned in uncommitted transactions by the recovery module;

according to the failover instruction, starting in the secondary site a second server which is provided with a second DBMS which is to take over the first DBMS; and after confirming a completion of the log applying operation and undoing the logs concerned in the uncommitted transactions, informing the second server of a completion of the data recovery process from the recovery module.

* * * * *